US007979555B2

(12) United States Patent
Rothstein et al.

(10) Patent No.: US 7,979,555 B2
(45) Date of Patent: Jul. 12, 2011

(54) CAPTURE AND RESUMPTION OF NETWORK APPLICATION SESSIONS

(75) Inventors: Jesse Abraham Rothstein, Seattle, WA (US); Arindum Mukerji, Seattle, WA (US)

(73) Assignee: ExtraHop Networks,Inc., Seattle, WA (US)

( * ) Notice: Subject to any disclaimer, the term of this patent is extended or adjusted under 35 U.S.C. 154(b) by 420 days.

(21) Appl. No.: 11/679,356

(22) Filed: Feb. 27, 2007

(65) Prior Publication Data
US 2008/0209045 A1 Aug. 28, 2008

(51) Int. Cl.
*G06F 15/16* (2006.01)
(52) U.S. Cl. ........ 709/227; 709/224; 709/225; 709/246; 709/249
(58) Field of Classification Search .................. 709/227
See application file for complete search history.

(56) References Cited

U.S. PATENT DOCUMENTS

| 5,027,269 | A | * | 6/1991 | Grant et al. .................. 709/224 |
| 5,715,464 | A | | 2/1998 | Crump et al. |
| 5,857,188 | A | * | 1/1999 | Douglas .......................... 707/9 |
| 5,928,363 | A | | 7/1999 | Ruvolo |
| 6,263,049 | B1 | * | 7/2001 | Kuhn .......................... 379/32.01 |
| 6,385,729 | B1 | | 5/2002 | DiGiorgio et al. |
| 6,560,636 | B2 | | 5/2003 | Cohen et al. |
| 6,704,311 | B1 | | 3/2004 | Chuah et al. |
| 6,807,565 | B1 | | 10/2004 | Dodrill et al. |
| 6,883,015 | B1 | | 4/2005 | Geen et al. |
| 7,580,356 | B1 | | 8/2009 | Mishra et al. |
| 7,606,706 | B1 | * | 10/2009 | Rubin et al. .................. 704/235 |
| 7,639,613 | B1 | | 12/2009 | Ghannadian et al. |
| 7,774,456 | B1 | | 8/2010 | Lownsbrough et al. |
| 2002/0035604 | A1 | * | 3/2002 | Cohen et al. .................. 709/205 |
| 2002/0065912 | A1 | * | 5/2002 | Catchpole et al. ............ 709/224 |
| 2002/0152209 | A1 | | 10/2002 | Merugu et al. |
| 2003/0135667 | A1 | | 7/2003 | Mann et al. |
| 2003/0212900 | A1 | | 11/2003 | Liu et al. |
| 2003/0233361 | A1 | | 12/2003 | Cady |
| 2005/0066196 | A1 | | 3/2005 | Yagi |
| 2005/0086255 | A1 | * | 4/2005 | Schran et al. ................. 707/102 |
| 2005/0125553 | A1 | * | 6/2005 | Wu et al. ...................... 709/233 |

(Continued)

OTHER PUBLICATIONS

Lin, Mark. "An Overview of Session Hijacking at the Network and Application Levels" [Online]. Jan. 18, 2005 [Retrieved on: Jun. 16, 2009]. SANS Institute. [Retrieved from: http://www.sans.org/reading_room/whitepapers/ecommerce/an_overview_of_session_hijacking_at_the_network_and_application_levels_1565].*

*Primary Examiner* — Philip J Chea
*Assistant Examiner* — Eric W Shepperd
(74) *Attorney, Agent, or Firm* — Meyertons Hood Kivlin Kowert & Goetzel, P.C.; Jeffrey C. Hood; Joel L. Stevens

(57) ABSTRACT

A system and method for capture and resumption of network application sessions in a network system. A transaction may be detected between a client and server that includes application session state information. The session state information may relate to a session between the client and the server. The Application session state information may be recorded in response to the detection of the transaction, and the application session state information may not be deleted according to session information expiration policies (e.g., of the client). User input may be received which requests to review the captured network application session. Correspondingly, a network request comprising captured credentials of the captured session may be generated and forwarded to the server. The network request may be usable to enable resumption of the captured network application session.

28 Claims, 7 Drawing Sheets

U.S. PATENT DOCUMENTS

| | | |
|---|---|---|
| 2005/0251009 A1* | 11/2005 | Morita et al. ................. 600/407 |
| 2006/0045016 A1 | 3/2006 | Dawdy et al. |
| 2006/0184535 A1 | 8/2006 | Kaluskar et al. |
| 2008/0031141 A1 | 2/2008 | Lean et al. |
| 2008/0059582 A1* | 3/2008 | Hartikainen et al. ......... 709/204 |
| 2009/0034426 A1 | 2/2009 | Luft et al. |

* cited by examiner

CAPTURE AND RESUMPTION OF NETWORK APPLICATION SESSIONS

FIELD OF THE INVENTION

The present invention relates to the field of computer networks and more particularly to a system and method for capture and resumption of network application sessions.

DESCRIPTION OF THE RELATED ART

On most of today's computer networks, data is packaged into collections of bytes called packets. The packets are generally transmitted and received by a network interface card (NIC) (e.g., of a computer) in a wireless manner or over a physical medium, such as a cable. Additionally, the packets are transmitted and received according to a network communication protocol suite, such as TCP/IP (transmission control protocol/internet protocol), among others.

Network monitors have long existed in order to assess the health of and troubleshoot computer networks. These tools have taken the form of software applications as well as specialized network devices. Some network monitors record or analyze packets as they are transmitted over the network. Such tools are commonly called packet sniffers. Packet sniffers that further analyze or dissect the underlying network or application protocols are called protocol analyzers. In general, packet sniffers and protocol analyzers passively monitor network traffic without participating in the communication protocols. In some instances, they receive a copy of each packet on a particular network segment or VLAN (virtual local area network). This is generally done though a port mirror or SPAN (switched port analyzer) port on a managed Ethernet switch. In other instances, they are placed in the network between two or more devices and copy packets from one interface to the other.

Unlike protocol analyzers, network proxies do participate in the communication protocols. Network proxies must be placed in the network path between the endpoints. Proxies provide a variety of services, such as caching, content filtering, and access control. HTTP (hypertext transfer protocol) content filters are network proxies that participate in the HTTP protocol in order to limit the content that the client is able to access generally for the purpose of restricting inappropriate content. The content may be filtered in a variety of ways including site blacklists and real-time analysis. Web application firewalls are similar to HTTP content filters; however, rather than limit content by what is appropriate, the web application firewall attempts to protect the web application from malicious or malformed requests. To do so, the web application firewall blocks requests that are malformed, violate configured or learned rules, and/or do not follow a correct path through the site.

Certain operations in network applications may explicitly terminate the application session and invalidate any saved state. Many applications may also specify an upper-bound on the amount of time a session may be held open without new activity; after this time elapses, the session will be terminated. However, such termination generally prevents resumption/review of the session. Therefore, it would be desirable to provide a system and method which allows for resumption/review of network sessions that may otherwise be terminated.

SUMMARY OF THE INVENTION

Various embodiments of a system and method for capture and resumption of application sessions are presented herein. In general, capture of network application sessions comprises the process of monitoring and recording network traffic in order to enable the review, analysis, and/or replay of application transactions at a later time. Embodiments of the invention may operate to prevent termination of a session or deletion of session information (among other processes) in order to allow for subsequent review of the application session. In general, network applications present data to clients or servers involved in the session indicating their session state. In some embodiments, a network device or other software may capture this presentation of data, thereby making it possible to resume the session for purposes of review, auditing, or testing, among others. In one embodiment, application sessions may be reviewed in order to determine whether any anomalous or unauthorized transactions are being attempted or executed. In another embodiment, such audits may take place for the purpose of performance tuning or fault isolation. In some embodiments, such review may occur for the purpose of determining appropriateness of viewed content, for example, to enforce compliance with acceptable Internet usage policies on a corporate or educational network, or for parental monitoring. Without the aforementioned session data, it may not be possible to reproduce the prior transaction for subsequent review in this manner. Thus, the present invention may allow for review and/or resumption of previous network sessions in various networking systems.

Briefly stated, a system, apparatus, and method is disclosed for the capture and resumption of network sessions, e.g., network application sessions, as described above. When a client engages in a session with a server using an application protocol such as, for example, HTTP, it may collect and present session information, e.g., using HTTP cookies. The client may also provide authentication and/or authorization information using one or more of a multitude of authentication mechanisms, including, for example, Basic-Auth, NTLM (NT LAN manager), and the like. Additionally, the client may provide HTTP session data using methods such as POST form submissions. In some embodiments, the client may include session state information within the Uniform Resource Identifier (URI), which is described in RFC (request for comments) 2396. When such session data is detected, it is recorded in order to facilitate future resumption of the session. Additionally, various methods (such as those described herein, among others) are employed in order to prevent the invalidation of this session. Note that while the aforementioned examples relate to the HTTP protocol, HTTP is only used as an example due to its pervasiveness, and that other protocols and communication methods are envisioned.

In one embodiment, a network monitor device (NMD) may monitor network traffic. The NMD may track network connections from and to the client. Upon detecting a transaction that includes application session state or authentication credentials, the NMD may record this session state. In some embodiments, the NMD may also be configured to block requests that invalidate and/or tear down session state (e.g. "logout" transactions) and to periodically request certain application resources from the server in order to prevent the session from expiring. Additionally, in the case of HTTP, a session cookie may be employed by the application with the understanding that the session cookie will be removed upon the termination of the client application viewer or the expiration of the cookie. The NMD may be configured to capture such session cookies without adhering to their expiration policy, thus extending their lifetime beyond that of the viewer on the client system. When an administrator or user wishes to review a captured session, the NMD may accept the user's request, inject the captured credentials, and forward this request to the server, thus enabling the resumption of previously captured network sessions.

BRIEF DESCRIPTION OF THE DRAWINGS

A better understanding of the present invention can be obtained when the following detailed description of the preferred embodiment is considered in conjunction with the following drawings, in which.

Figure 1:
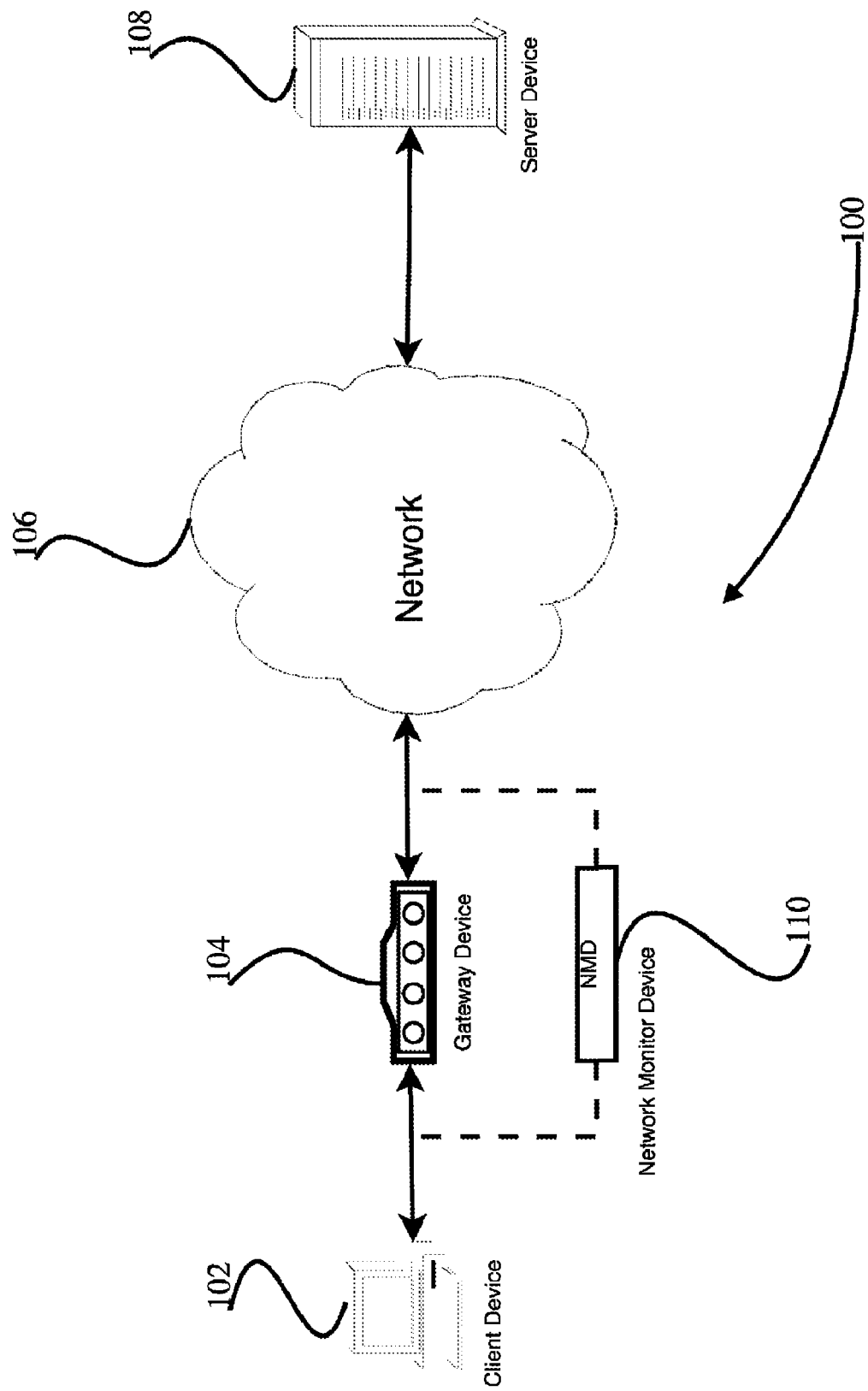
FIG. 1 illustrates a functional block diagram of an exemplary system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" or "memory" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Network Connection—a specific exchange of packets over one or more physical or wireless links that enable a computing device to communicate with another computing device over a network. A "communication endpoint" refers to one of the computing devices participating in a network connection. One such network connection may be a TCP connection. TCP connections are virtual connections between two computing devices over a network that initiate, exchange data, and terminate according to the TCP protocol. The TCP protocol is described in more detail in RFC 793, which is available through the IETF. A network connection "over" a particular path or link refers to a network connection that employs the specified path or link to establish and/or maintain a communication.

Client, Server—As used herein the term "client" refers to a computing device's general role as a requester of data or services, and the term "server" refers to a computing device's role as a provider of data or services. In general, it is possible that a computing device can change its role from client to server or vice versa, acting as a client in one transaction and as a server in another transaction or both simultaneously.

Application Session or Session—a series of application interactions between two or more communication endpoints over a network that occur within one or more network connections. Several sessions can use the same network connection, and sessions may span multiple individual connections in parallel or in series.

Session State or Session Data—state information associated with an application session stored on the server. Within this specification, session state includes any sequence of data such as a cookie presented by the client or server for the purpose of identifying the state of the application session. Typically, the client will present this session state during the initiation of an application transaction.

Application Protocol—a network communication protocol that occupies layer 7 of the ISO Open Systems Interconnection (OSI) seven layer model. Common application protocols include HTTP, SMTP (simple mail transfer protocol), SIP (session initiation protocol), RTSP (real time streaming protocol), RTP (real time transport protocol), and FTP (file transfer protocol). Within this specification, protocols that can work in conjunction with or on top of HTTP, such as SOAP (simple object access protocol), are also considered application protocols.

Contact—the digital identity of an individual with whom one communicates using an electronic communication application and/or protocol such as email, instant messaging, Internet Relay Chat (IRC), or the like.

Cookie—a sequence of data that a server gives to a client as part of a transaction. The client is expected to include the cookie in subsequent requests to the server. "Session cookies" are cookies that have a lifetime matching that of the session. Typically session cookies are not written to persistent storage and are discarded when the application, such as a web browser, is closed. HTTP cookies are one common type of cookie and are described further in RFC 2109 and RFC 2965, which are available through the IETF.

Digital Credential or Authorization Token—a sequence of data used by a server to grant access to specific resources. The client usually presents the "credential" upon requesting access to such resources. A credential can take the form of a password, session cookie, HTTP Basic-Auth token, NTLM response, Kerberos ticket, SSL (secure sockets layer) client certificate, and/or other token. In many instances, the credential is encrypted or cryptographically hashed.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Illustrative Operating Environment

FIG. 1 illustrates a block diagram of an exemplary system according to one embodiment of the present invention. However, it should be noted that not all of the illustrated components may be required to practice the invention. Additionally, the specific arrangement and connections shown are not intended to limit the scope of the invention. In other words, other arrangements, configurations, connections, and/or systems are envisioned. Thus, further variations or modifications to these illustrated or described components are envisioned.

As shown in FIG. 1, system 100 may include client device 102, gateway device 104, network 106, server device 108, and Network Monitoring Device (NMD) 110. As shown, client device 102 may communicate with server 108 through gateway device 104 and over network 106. In some embodiments, NMD 110 may be configured to observe this communication. In various embodiments, the NMD 110 may be physically or virtually connected to the network on either or both sides of gateway device 104. Although not shown, NMD 110 may monitor the communications over other types of networks, e.g., wireless networks. The NMD 110 may be operable to perform a capture of session data as described herein.

One embodiment of client device 102 is described in more detail below in conjunction with FIG. 2 (where it is depicted as client device 200). The client device 102 may include virtually any computing device capable of communicating with another computing device. Such communication may include requesting or providing data or services including, for example, HTTP transactions, Voice over Internet Protocol (VOIP), Instant Messaging (IM), file transfers, email, and the like. The set of such devices may include devices that typically connect using a wired communications or carrier medium such as personal computers, microprocessor-based or programmable consumer electronics, video gaming consoles, network media players, network PCs, and the like. The set of such devices may also include devices that typically connect using a wireless communications medium such as mobile phones, radio frequency (RF) devices, infrared (IR) devices, integrated devices combining one or more of the preceding devices, or virtually any mobile device. Similarly, the client device 102 may be any device that is capable of communicating over a wired or wireless communication medium such as a Personal Digital Assistant (PDA), Ultra Mobile PC (UMPC), wearable computer, and the like.

The client device 102 may further include various client applications. For example, the client device 102 may include a web browser that transmits HTTP requests over the network 106. In addition, the client device 102 may employ a variety of other client applications to communicate with other devices over network 106, including, but not limited to Voice Over Internet Protocol (VOIP), Instant Messaging (IM), email, Peer-to-Peer file sharing (P2P), or the like. In one embodiment, the client device 102 may employ a plurality of network sessions over one or more possibly secure network connections to another computing device, such as gateway 104, server device 108, or the like. In another embodiment, the client device 102 may employ a tunneling protocol, such as Layer-2 Tunneling Protocol (L2TP), in order to communicate remotely with computing devices such as the gateway 104.

In various embodiments, the client device 102 may communicate with network 106 employing a variety of network interfaces and associated communication protocols. Client device 102 may, for example, have broadband access in the form of a Digital Subscriber Line (DSL), Integrated Services Digital Network (ISDN), cable modem, Digital Signal 1 (DS1) or T1 circuit, Worldwide Interoperability for Microwave Access (WiMAX), or the like. Client device 102 may further employ communication protocols such as Serial Line IP (SLIP) protocol, Point to Point Protocol (PPP), Synchronous Optical Networking (SONET), Asynchronous Transfer Mode (ATM), as well as any of a variety of wireless networking protocols.

The network 106 is configured to allow network connections between client device 102 and other networked devices, such as server device 108. The network 106 may be configured to employ any form of carrier medium for communicating information from one computing device to another. In one embodiment, the network 106 may be the Internet, and may include local area networks (LANs), wide area networks (WANs), direct connections, such as through a universal serial bus (USB) port, Ethernet link, other forms of carrier media, or any combination thereof. On an interconnected set of computer networks, including those based on differing architectures and protocols, a router may be configured to forward packets from one network to another Communication links within LANs may include unshielded twisted pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), optical fiber links, wireless links including satellite links, or other communications links known to those skilled in the art. Note that the above enumerated communication links, networks, device, and protocols are exemplary only and that other systems, processes, and configurations are envisioned.

The network 106 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as the client device 102, and the like, with various degrees of mobility. For example, the network 106 may enable a wireless network connection over one of the aforementioned access technologies using a protocol for wireless data transfer such as Global System for Mobil communication (GSM), General Packet Radio Services (GPRS), Enhanced Data GSM Environment (EDGE), Wideband Code Division Multiple Access (WCDMA), and the like.

Furthermore, remote computing devices and other related electronic devices could be remotely connected to either LANs or WANs via a modem and/or analog telephone link. In essence, the network 106 includes any communication method or carrier medium by which information may be exchanged between the client device 102 and the server device 108.

The gateway device 104 includes virtually any device that forwards network traffic. Such devices include, for example, routers, proxies, firewalls, access points, link load balancers, devices that perform network address translation, or any combination of the preceding devices. The gateway device 104 may receive data packets from and transmit data packets to the Internet, an intranet, or a LAN accessible through another network, among others. The gateway device 104 may recognize packets that are part of a particular communication protocol and/or are the same network connection or application session. The gateway device 104 may perform special processing on such packets including granting access to the client machine, logging or not logging an event, and network address and port translation.

The NMD 110 may include virtually any device that monitors network traffic. In various embodiments, the NMD 110 may be or include, for example, packet sniffers, protocol analyzers, and the like. In one embodiment, the NMD 110 may receive a copy of each packet transmitted or received by the client device 102. These packets may be copied and delivered by the gateway device 106. Although not pictured, these packets may be copied and delivered by an Ethernet switch, hub, or the like. Alternatively, these packets may be received and then retransmitted by the NMD 110. In one embodiment, the NMD 110 may be integrated directly with the gateway device 104. In another embodiment, the NMD 110 may be placed in the network path between the client device and the server device. In another embodiment, the NMD 110 may be integrated directly with the client device 102 where it may be implemented as software, hardware, or some combination thereof. In another embodiment, the NMD 110 may include a cluster of network devices working together on one or more networks. In another embodiment, NMD 110 may include a collection of client applications working together on one or more client devices. In some embodiments, the NMD 110 may employ a process substantially similar to that described below in conjunction with FIG. 5 to perform at least some of its actions.

In one embodiment, the NMD 110 may be implemented using one or more personal computers, servers, microprocessor-based or programmable consumer electronics, video gaming consoles, network media players, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. An embodiment of a network device that could be used as the NMD 110 is the network device 300 of FIG. 3, configured with appropriate software.

Server device 108 may include any computing device capable of establishing and/or maintaining a network connection with the client device 102. In one embodiment, the server device 108 is configured to operate as a web server. However, the server device 108 may also operate as a messaging server, File Transfer Protocol (FTP) server, database server, chat server, media server, online gaming server, and the like. Additionally, the server device 108 may be a single component in a larger online application. Devices that may operate as the server device 108 include personal computers, multiprocessor systems, microprocessor-based or programmable consumer electronics, network PCs, integrated devices combining one or more of the preceding devices, and the like.

Illustrative Client Device

Figure 2:
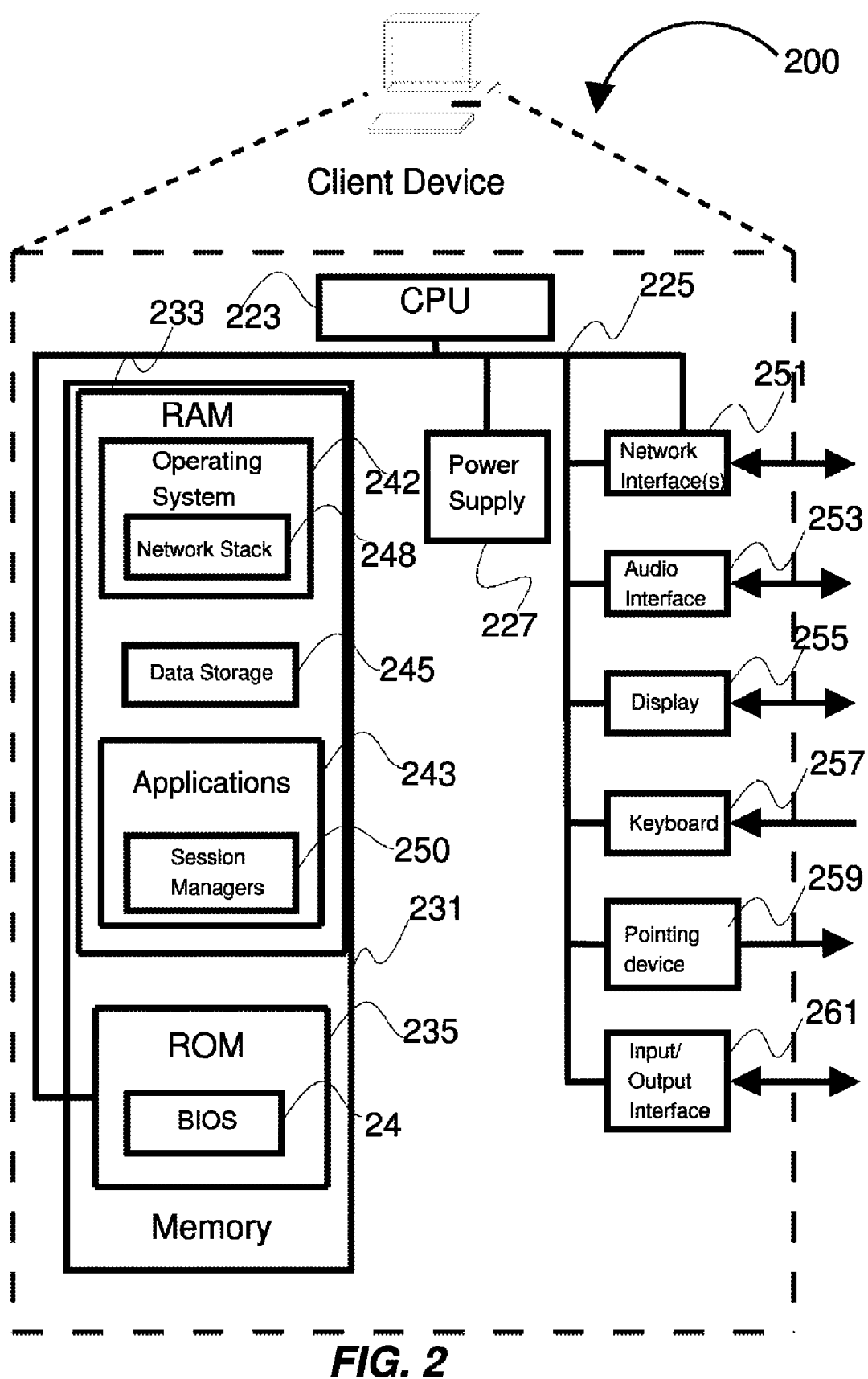
FIG. 2 illustrates an exemplary client device according to one embodiment.

FIG. 2 shows one embodiment of client device 200 that may be included in a system implementing the invention. Client device 200 represents one embodiment of an implementation of client device 102 of FIG. 1.

Generally, the client device 200 may include any personal electronic device. Oftentimes, electronic devices may be capable of personal communication by connecting to one or more wired and/or wireless networks, connecting to multiple nodes of a single wired and/or wireless network, communicating over one or more channels to one or more networks, or otherwise engaging in one or more network connections. The client device 200 may, for example, comprise electronic devices such as Personal Digital Assistants (PDAs), handheld computers, personal computers, microprocessor-based or programmable consumer electronics, video gaming consoles, network media players, network PCs, wearable computers, or the like. The client device 200 may also include a server device, such as the server device 108, among others.

The client device 200 may include many more or less components than those shown in FIG. 2. As shown in the figure, the client device 200 includes a processing unit 223 in communication with memory 231 via bus 225.

The client device 200 may also include a power supply 227, one or more network interfaces 251, an audio interface 253, a display 255, a keyboard 257, a pointing device 259, and/or an input/output interface 261, among others. The power supply 227 may provide power to client device 200. Note that in some embodiments, a rechargeable or non-rechargeable battery may be used to provide power. The power may also be provided by an external power source, such as an AC adapter or a powered docking cradle that supplements and/or recharges a battery.

The client device 200 may optionally communicate with a base station (not shown), or directly with another computing device. The network interface 251 may allow the client device 200 to communicate over one or more networks, and may be constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and/or the like. Network interface 251 may sometimes be referred to as a transceiver, transceiving device, or network interface card (NIC).

The audio interface 253 is arranged to produce and receive audio signals such as the sound of a human voice. For example, the audio interface 253 may be coupled to a speaker and microphone (not shown) to enable telecommunication with others and/or generate an audio acknowledgment for some action. The display 255 may be a liquid crystal display (LCD), gas plasma, light emitting diode (LED), cathode ray tube (CRT), or any other type of display used with a computing device. The display 255 may also include a touch sensitive screen arranged to receive input from an object such as a stylus or a digit from a human hand.

The keyboard 257 may comprise any input device arranged to receive input from a user. For example, the keyboard 257 may include a push button numeric dial, or a keyboard. The keyboard 257 may also include command buttons that are associated with launching software applications or executing a predefined series of commands. The pointing device 259 may comprise a trackball, mouse, stylus, or the like.

The client device 200 also comprises input/output interface 261 for communicating with external devices, such as a headset, or other input or output devices not shown in FIG. 2. Input/output interface 261 can utilize one or more communication technologies, such as USB, infrared, Bluetooth™, or the like.

The memory 231 may include a RAM 233, a ROM 235, and other storage means. The memory 231 illustrates another example of computer storage media for storage of information such as computer readable instructions, data structures, program modules or other data. The memory 231 may store a basic input/output system ("BIOS") 241 for controlling low-level operation of the client device 200. The memory 231 may also store an operating system 242 for controlling the operation of the client device 200. It will be appreciated that this component may include a general purpose operating system such as a version of UNIX or Linux, a specialized client communication operating system such as Windows Mobile™ or the Symbian™ operating system, or an embedded or real-time operating system such as VxWorks or Neutrino. The operating system 242 may include, or interface with a Java virtual machine module that enables control of hardware components and/or operating system operations via Java application programs.

The operating system 242 may also include network stack 248. The network stack 248 may represent a suite of components that enable various networking communications. The network stack 248 may be referred to as a TCP/IP stack, a TCP/IP protocol suite, or a networking protocol stack. The network stack 248 may be configured to manage various networking communication protocols within layers 3 and 4 (e.g., the network layer, and the transport layer) of the seven-layer protocol stack as defined by the ISO-OSI (International Standards Organization-Open Systems Interconnection) framework. For example, the network stack 248 may include components configured to manage TCP, UDP (user datagram protocol), RTP, SCTP (stream control transmission protocol), SPX communications, or the like. The network stack 248 may also include components configured to manage IP, ICMP (Internet control message protocol), ARP (address resolution protocol), BGP (border gateway protocol), OSPF (open shortest path first), RIP (routing information protocol), IGRP (interior gateway routing protocol), X.25 communications, or the like. Moreover, the network stack 248 may be configured to operate in conjunction with various security applications to enable the client device 200 to request and/or establish one or more tunneled network connections with another computing device, including L2TP over DTLS (datagram transport layer security), PPP (point-to-point protocol) over SSH (secure shell), or a variety of other tunneling connection types and/or protocols, including L2TP, PPP, PPTP (point-to-point tunneling protocol), IPSec (Internet protocol security), GRE (generic routing encapsulation), MBone (multicast backbone), SSL/TLS (transport layer security), and the like.

The memory 231 may further include at least one data storage 245, which can be utilized by the client device 200 to store, among other things, applications 243 (including session managers 250) and/or other data. For example, the data storage 245 may also be employed to store information that describes various capabilities of the client device 200. The information may then be provided to another device based on any of a variety of events, including being sent as part of a header during a communication, sent upon request, or the like.

The applications 243 may include computer executable instructions which, when executed by the client device 200, transmit, receive, and/or otherwise process messages (e.g., SMS, MMS, IM, email, and/or other messages), audio, video, and enable telecommunication with another user of another client device. Other examples of application programs include calendars, browsers, email clients, contact managers, task managers, transcoders, database programs, word processing programs, security applications, spreadsheet programs, games, and so forth.

Illustrative Network Device

Figure 3:
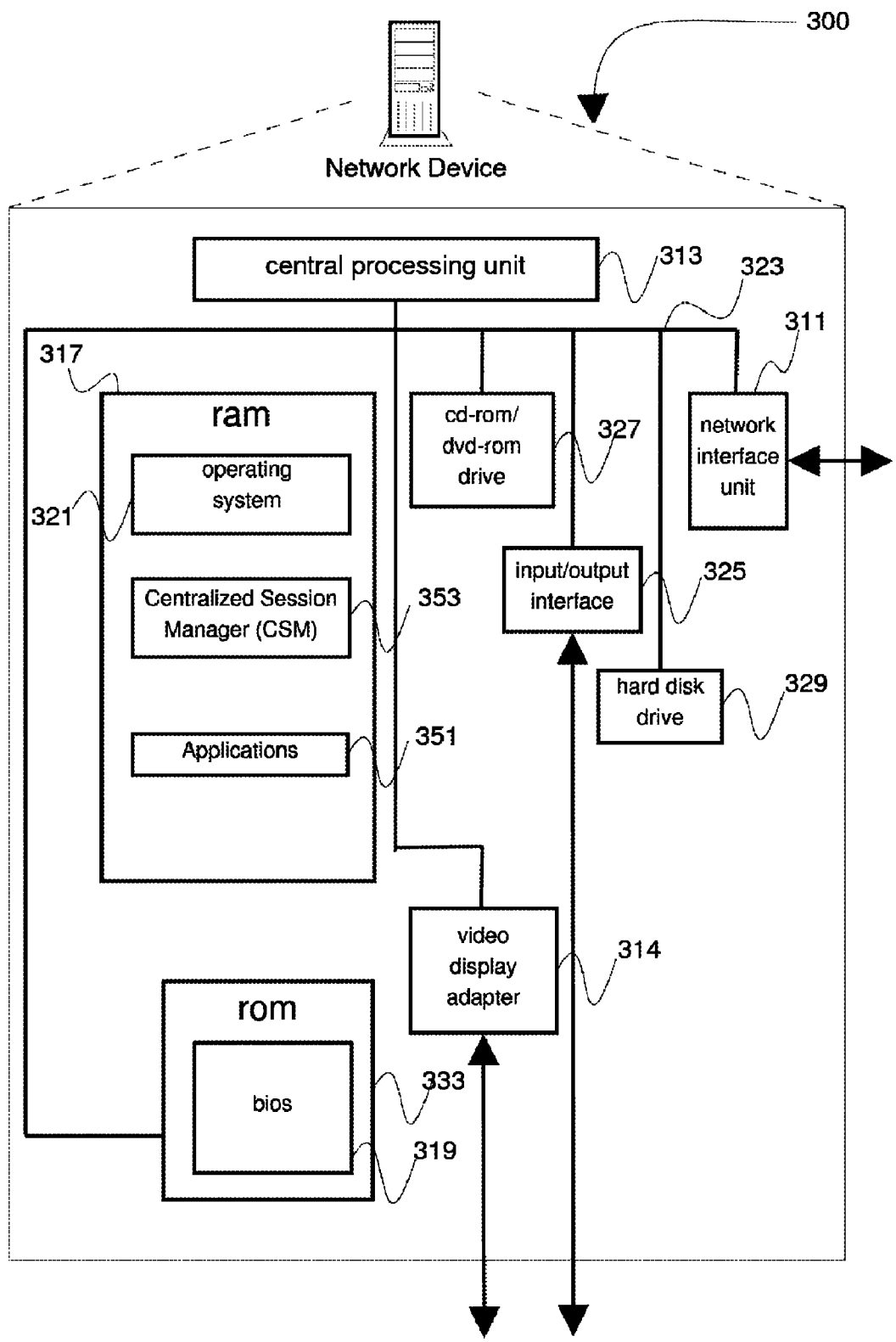
FIG. 3 illustrates a functional block diagram of an exemplary network device according to one embodiment.

FIG. 3 illustrates one embodiment of a network device, according to one embodiment of the invention. Network device 300 may include many more or less components than those shown. The components shown, however, are sufficient to disclose an illustrative embodiment for practicing the invention. The network device 300 may represent, for example, the NMD 110 of FIG. 1. The network device 300 may perform capture of application sessions.

The network device 300 may include processing unit 313, video display adapter 314, and a memory, which may be in communication with each other via bus 323. The memory generally includes RAM 317, ROM 333, and/or one or more permanent mass storage devices, such as hard disk drive 329, a tape drive, an optical drive, and/or a floppy disk drive, among others. The memory may store the operating system 321 for controlling operation of the network device 300.

As illustrated in FIG. 3, the network device 300 may also communicate with the Internet, or some other communications network, such as the network 106 in FIG. 1, e.g., via the network interface 311, which may be configured for use with various communication protocols including the TCP/IP protocol. The network interface unit 311 is sometimes known as a transceiver, transceiving device, or network interface card (NIC).

The network device 300 may also include an SMTP handler application for transmitting and receiving e-mail, an HTTP handler application for receiving and handing HTTP requests, and an HTTPS handler application for handling secure connections. The HTTPS (HTTP secure) handler application may initiate communication with an external application in a secure fashion. Moreover, network device 300 may further include other applications that support virtually any secure connection, including TLS, TTLS tunneled transport layer security), EAP (extensible authentication protocol), SSL, IPSec, and the like. Similarly, the network device 300 may include applications that support a variety of tunneling mechanisms, such as VPN (virtual private network), PPP, L2TP, and so forth.

The network device 300 may also include input/output interface 325 for communicating with external devices, such as a mouse, keyboard, scanner, or other input devices not shown in FIG. 3. Likewise, the network device 300 may further include additional mass storage facilities such as CD-ROM/DVD-ROM drive 327 and hard disk drive 329. Hard disk drive 329 may be utilized to store, among other things, application programs, databases, and the like.

In one embodiment, the network device 300 includes at least one Application Specific Integrated Circuit (ASIC) chip (not shown) coupled to the bus 323. The ASIC chip can include logic that performs some of the actions of the network device 300. For example, in one embodiment, the ASIC chip can perform a number of packet processing functions for incoming and/or outgoing packets. In one embodiment, the ASIC chip can perform at least a portion of the logic to enable the operation of session manager 353.

In one embodiment, the network device 300 can further include one or more programmable hardware elements, e.g., field-programmable gate arrays (FPGA) (not shown), instead of, or in addition to, the ASIC chip. A number of functions of the network device 300 can be performed by the ASIC chip, the FPGA, by CPU 313 with instructions stored in memory, or by any combination of the ASIC chip, FPGA, and CPU.

The memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 351 may be loaded into memory and run on the operating system 321. Examples of application programs may include email programs, routing programs, schedulers, calendars, database programs, word processing programs, web browsers, traffic monitoring programs, security programs, and so forth.

The operating system 321 may further include networking components (not shown) that enable network device to monitor network traffic and/or establish and maintain network connections with at least another computing device. As such, the operating system 321 may include various components to manage operations of the Open Systems Interconnection (OSI) network stack, including Internet Protocol (IP), TCP, UDP, SSL, HTTP, and the like.

Figure 4:
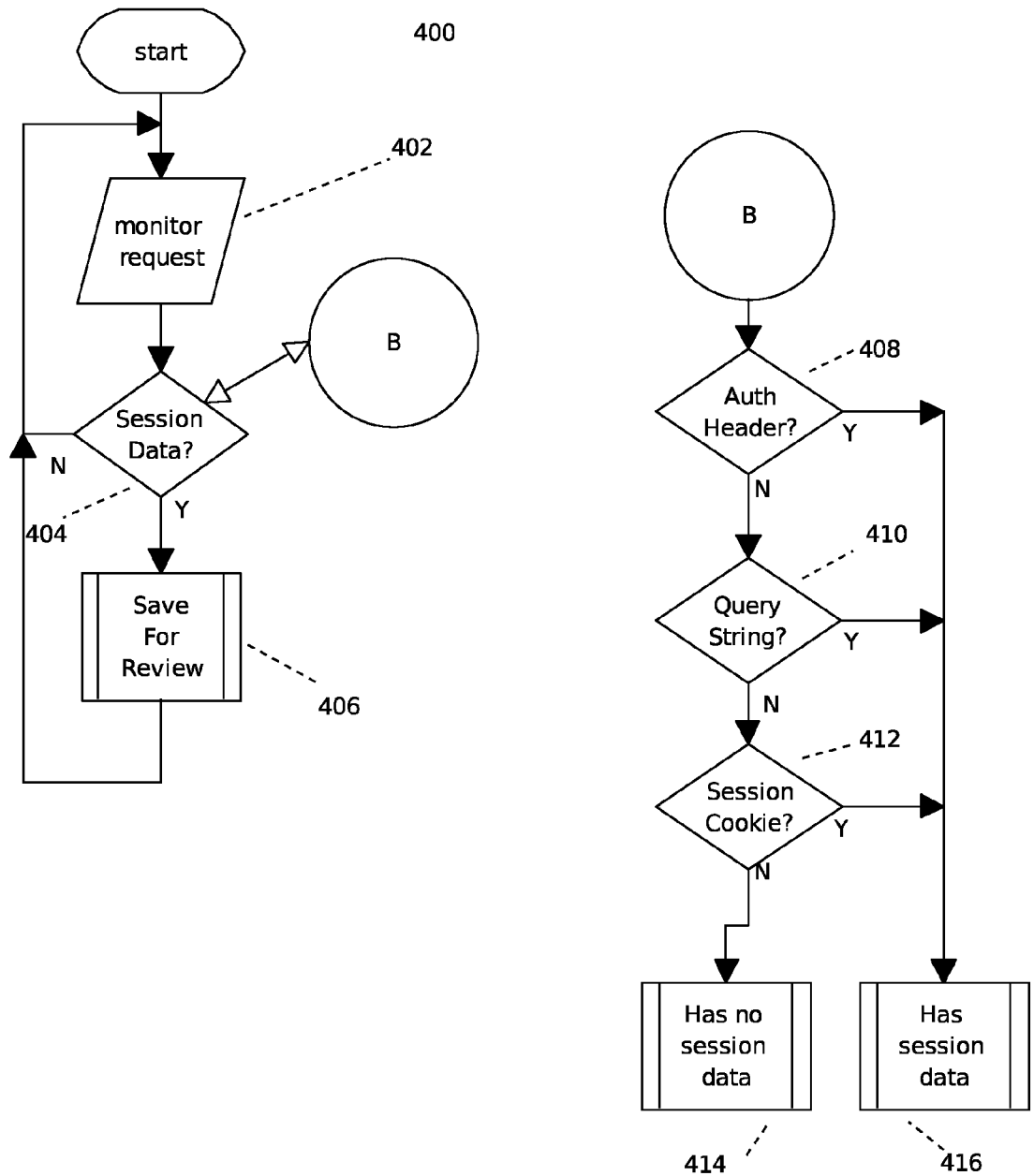
FIG. 4 is a flowchart diagram illustrating one embodiment of capture of application sessions.

FIG. 4—Capture of Application Sessions

FIG. 4 is a flowchart diagram illustrating one embodiment of capture of application sessions. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by the NMD 110 of FIG. 1. As shown, this method may operate as follows.

As shown in FIG. 4, process 400 begins, after a start block, at block 402, where traffic may be monitored until a request is detected. Processing then flows to block 404, where the request may be examined in order to determine whether the object being requested includes application session data. One embodiment of such a determination is shown in FIG. 4, subprocess B. If the request includes application session data, processing moves to block 406. At block 406, transactional information about the request and requester with the state required to resume the application session may be recorded for later analysis. If the request does not include application session data, control returns to block 402, whereupon a next request, if any, is awaited.

FIG. 4, subprocess B begins at block 408. At block 408, the request may be examined for new authentication or authorization credentials. Such credentials may include passwords, challenge-response, two-factor authentication, or the like. If such credentials are found, processing continues to block 416. Otherwise, processing continues on to block 410. At block 410, the request parameters may be examined to determine whether any session data is provided in the request. These request parameters may be included in form submissions or parameterized query strings. If such session data is found, processing continues to block 416. Otherwise, processing flows to block 412. At block 412, the request may be examined for attributes that characterize a unique session. An example of such an attribute for the HTTP protocol is an HTTP session cookie. If such an attribute is lacking, processing proceeds to block 414. Otherwise, processing is diverted to block 416. At block 414, a determination that the request includes no session data may be made, and control may return to block 404 with a negative return value. At block 416, a determination that the request includes relevant session data may be made, and control may return to block 404 with a positive return value. At block 406, transactional information about the request and requester with the state required to resume the application session may be recorded for later analysis. Processing then returns to block 402, whereupon the system continues to await a new request. The expiration policy of the aforementioned session state, if any, contained in the request from the client may not be honored.

Figure 5:
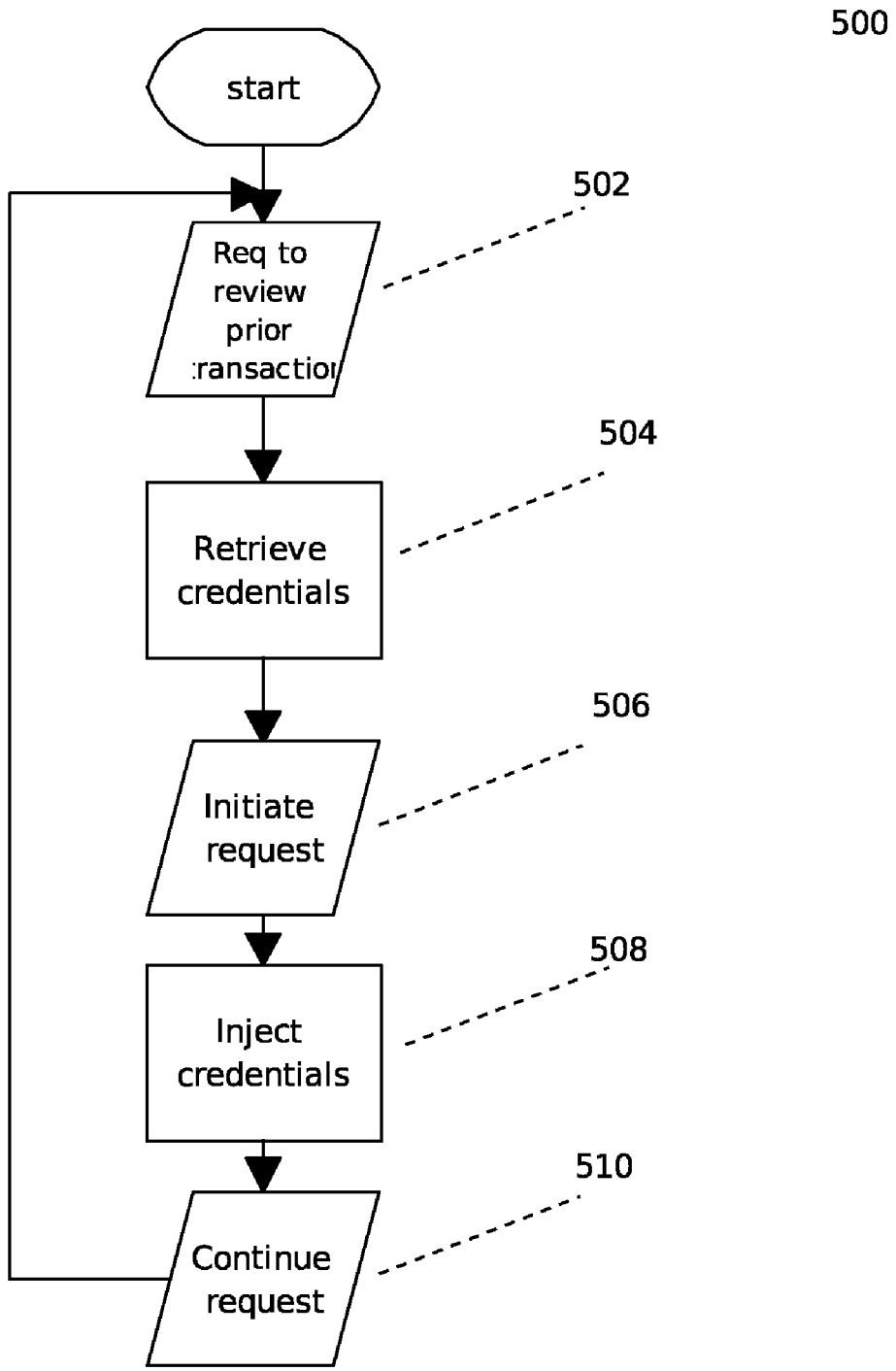
FIG. 5 is a flowchart diagram illustrating one embodiment for resumption of application sessions.

FIG. 5—Resumption of Application Sessions

FIG. 5 is a flow chart diagram illustrating an exemplary method for resuming a captured session, recorded in block 412 of FIG. 4. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by NMD 110 of FIG. 1. As shown, this method may operate as follows.

As indicated above, process 500 of FIG. 5 may be implemented, for example, within the NMD 110 of FIG. 1. As shown in FIG. 5, process 500 begins, after a start block, at block 502, where a request to review a prior transaction may be received from an administrator or other user. The request may, for example, originate from an interactive process utilizing a graphical user interface (GUI). Processing then flows to block 504. At block 504, session credentials for the reviewed transaction may be retrieved. As described in FIG. 4, such credentials may include, but are not limited to session cookies, session form data, passwords, HTTP Basic-Auth tokens, NTLM responses, Kerberos tickets, SSL client certificates, and/or other authentication information. Processing then continues to block 506. At block 506, the reviewed request may be initiated to the server with which the transaction was recorded. Processing then continues to block 508. In block 508, the retrieved session state from block 504 may be injected into the request initiated in block 506. Processing then continues on to block 510. At block 510, the request is continued, and the response is delivered to the administrative or reviewing user. Processing then continues back to block 502, whereupon the next reviewing request, if any, is awaited.

Figure 6:
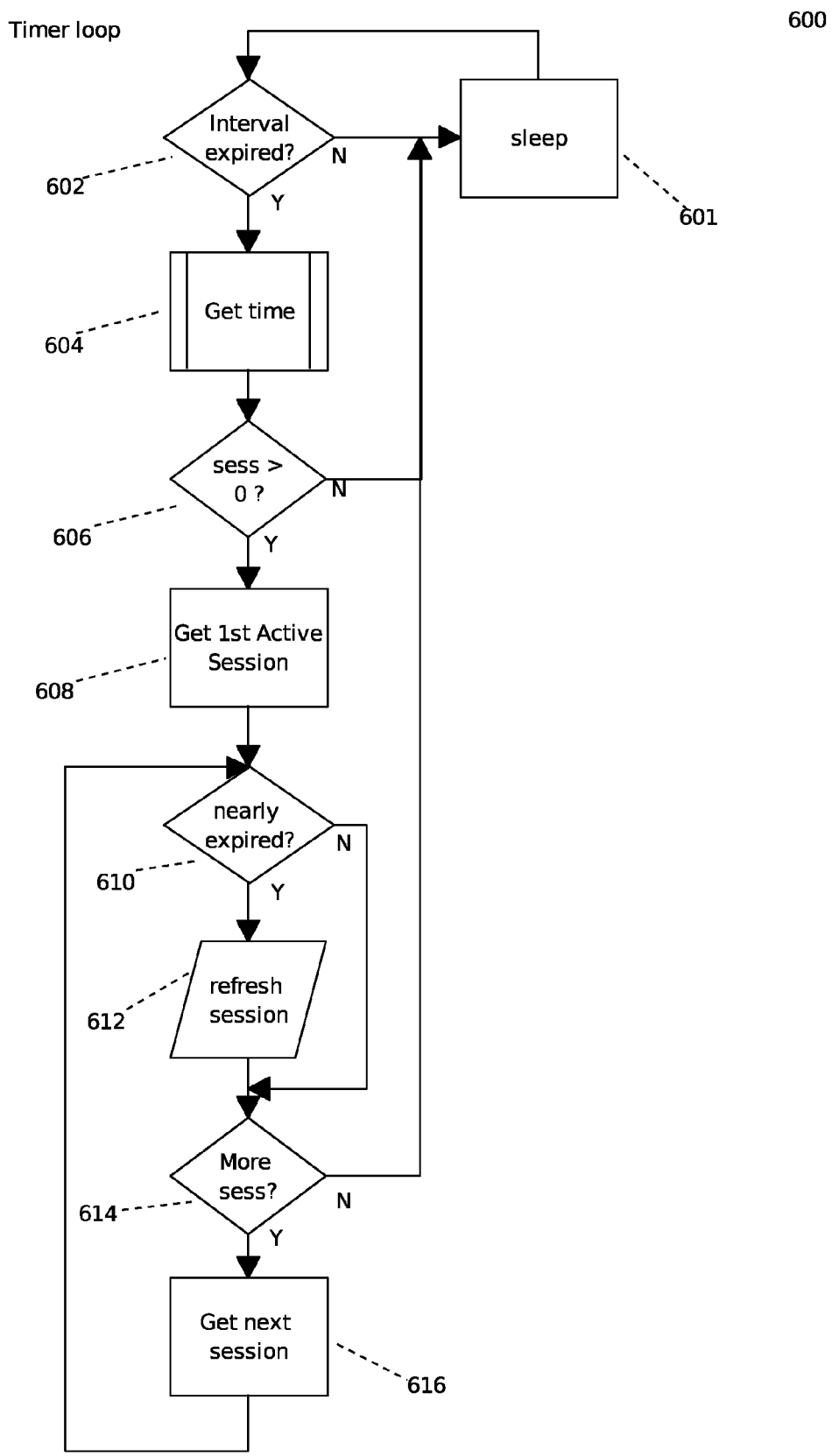
FIG. 6 is a flowchart diagram illustrating one embodiment for periodically refreshing monitored network sessions prior to their expiration.

FIG. 6—Refreshing Network Sessions

FIG. 6 is a flow chart diagram illustrating a method for automatically and periodically refreshing session state. The sessions to be automatically refreshed, or "kept-alive" are determined by the administrative or reviewing user in a separate procedure not shown in this flow chart. Note that the method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by NMD 110 of FIG. 1. As shown, this method may operate as follows.

As shown in FIG. 6, process 600 begins, at block 601, where the system remains dormant until a specified amount of time has elapsed. Upon the expiration of this time, control flows to block 602. In another embodiment, this timer mechanism may be "interrupt driven", wherein control leaves block 601 only if it is determined a priori that there are sessions ready to refresh. At block 602, a check may be performed to determine whether the process can proceed. If not, control returns to block 601. If the process can proceed, control moves to block 604. At block 604, the time may be noted for the purpose of determining whether sessions are close to expiring. Processing then continues to block 606. In block 606, the system, e.g., the NMD 110, may determine whether any active sessions are being periodically refreshed or kept-alive. If not, control returns to block 601. If so, control moves forward to block 608. In block 608, the first active monitored session referred to in block 606 may be retrieved. Processing then continues on to block 610. In block 610, the selected active monitored session may be tested for expiration. An example of such a test is to determine whether half the session timeout has elapsed, though many other examples of such comparisons may also be implemented. If the active monitored session is close to expiration, control moves to block 612. Otherwise, control moves to block 614. In block 612, the active monitored session is refreshed. In the case of HTTP, this may involve replaying a prior request with the associated credentials and/or cookies. Any updates to session state as provided by the server may be stored in order to allow session resumption at a later time, via the process described in FIG. 6, for example. Processing then continues to block 614. In block 614, the system may check to see whether any more active sessions are being periodically refreshed or kept alive. If not (e.g., the session refreshed in block 612 was the last to be refreshed in the current sweep), then control returns to block 601. If more active monitored sessions need to be checked in the current sweep, then control proceeds to block 616. In block 616, the next active monitored session is retrieved. Processing then returns to block 610.

Figure 7:
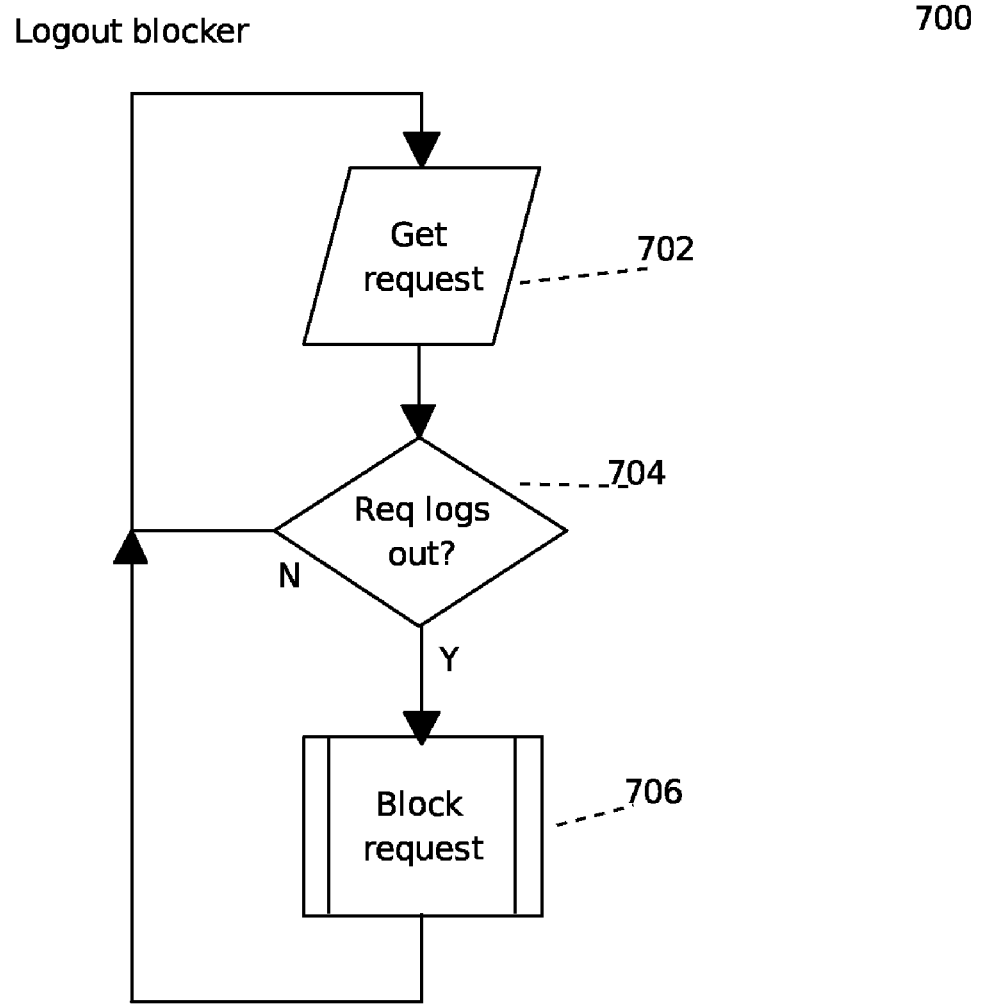
FIG. 7 is a flowchart diagram illustrating one embodiment for blocking requests that terminate an active network session.

FIG. 7 illustrates a logical flow diagram generally showing one embodiment of an overview process for ensuring that active monitored sessions, as iterated upon by the process described in FIG. 6, are kept alive. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by the NMD 110 of FIG. 1. As shown, this method may operate as follows.

As shown in FIG. 7, process 700 begins at block 702. A request from the client may be monitored and collected. Processing then continues to block 704. In block 704, the request may be examined for characteristics that indicate a request to terminate the session. If such characteristics are found, processing continues to block 706. Otherwise, control returns to block 702, whereupon the next request is awaited. In block 706, the request collected in block 702 and determined in block 704 to be a request to terminate the session is prevented from taking effect on the server. Processing then returns to block 702, whereupon the next request is awaited.

Thus, the preceding Figures describe various embodiments for capturing and resuming network sessions between a client and one or more servers. However, it should be noted that each block of a flowchart illustration (such as in FIGS. 4-7 described above) need not be limited to the ordering shown in the illustration, and may be performed according to any order, or even performed concurrently, without departing from the spirit of the invention.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for capture and resumption of an application session in a network system, the method comprising:
    detecting a transaction of the application session between a client and server, wherein the transaction includes session state information, wherein the session state information relates to the application session between the client and the server, and wherein, during the application session, content of the application session is provided from the server to the client;
recording the session state information of the application session in response to said detecting;
preventing termination of the application session after completion of the application session by the client;
providing information regarding the application session for presentation to a user;
receiving user input requesting review of the application session to view a portion of the content based on the provided information, wherein said receiving is performed at a point in time after completion of the application session by the client; and
generating a network request in response to said user input requesting review of the application session, wherein the network request comprises at least a portion of the session state information, wherein the at least a portion of the session state information comprises authentication credentials of the application session, wherein the network request is provided to the server, wherein said generating enables resumption of the application session;
wherein said detecting, said recording, said preventing, said providing, said receiving user input, and said generating are performed by a network monitoring device.

2. The method of claim 1, wherein the session state information is not deleted according to session expiration policies.

3. The method of claim 1, further comprising:
preventing the server from removing the session state information according to expiration policies of the server.

4. The method of claim 1, wherein said preventing termination comprises actively maintaining the application session between the client and the server prior to said receiving user input requesting review of the application session.

5. The method of claim 1, wherein said preventing termination comprises preventing a logout action for the client.

6. The method of claim 1, wherein said preventing termination comprises periodically refreshing the application session.

7. The method of claim 6, wherein said periodically refreshing the application session is not performed by the client.

8. The method of claim 6, wherein said periodically refreshing the application session comprises one or more of replaying a prior request with authentication credentials or session state information.

9. The method of claim 6, wherein said periodically refreshing the application session comprises one or more of generating a new request comprising authentication credentials or session state information.

10. The method of claim 1, wherein said preventing termination comprises:
analyzing the transaction; and
determining if characteristics of the transaction indicate a request to terminate the application session.

11. The method of claim 1, wherein the session state information is stored in one or more cookies.

12. The method of claim 1, wherein the session state information is stored in a Uniform Resource Identifier (URI).

13. The method of claim 1, further comprising:
monitoring network traffic of a network session between a client and a server, wherein said monitoring comprises tracking network connections, wherein said detecting is performed in response to said monitoring.

14. The method of claim 1, wherein said preventing termination comprises blocking requests that invalidate or tear down session state information, wherein said blocking requests operates to ignore session expiration policies.

15. The method of claim 1, wherein said preventing termination comprises periodically requesting application resources from the server in order to prevent the application session from expiring.

16. The method of claim 1, wherein the session state information is not deleted according to session state expiration policies of the client.

17. The method of claim 1, wherein said receiving is performed at a point in time after the application session is discarded or considered to be expired by the client.

18. The method of claim 1, wherein the application session corresponds to a second user using the client to visit the content of the application session, and wherein the user input is received from a first user to review the content received by the second user.

19. The method of claim 18, wherein said receiving is performed at a point in time later than an expiration time indicated by session expiration policies of the application session for the second user.

20. The method of claim 1, wherein said providing the information regarding the application session comprises providing a graphical user interface for receiving the user input requesting review of the application session.

21. The method of claim 1, wherein the network monitoring device is within a local network of the client, wherein the client accesses the Internet via the local network.

22. The method of claim 21, wherein the network monitoring device is interposed between the client and the Internet.

23. A computer-accessible, non-transitory, memory medium comprising program instructions for capture and resumption of an application session in a network, wherein the program instructions are executable to:
monitor network traffic of the application session between a client and a server coupled to the network, wherein the application session uses an application protocol, wherein, during the application session, content of the application session is provided from the server to the client, and wherein said monitoring comprises tracking network connections;
detect a transaction of the network traffic that includes authentication credentials;
record the authentication credentials in response to said detecting;
prevent termination of the application session after completion of the application session by the client;
provide information regarding the application session for presentation to a user;
receive user input requesting to review the application session to view a portion of the content based on the information, wherein said receiving is performed at a point in time after completion of the application session by the client; and
generate a network request comprising the authentication credentials of the application session, wherein the network request is provided to the server, and wherein said generating enables resumption of the application session;
wherein the program instructions are executable by a network monitoring device to perform said detecting, said recording, said preventing, said providing, said receiving user input, and said generating.

24. The memory medium of claim 23, wherein, in providing information regarding the application session, the program instructions are further executable to provide a graphical user interface for receiving the user input requesting review of the application session.

25. A network monitoring device, comprising:
   at least one port for coupling to a network;
   a processor; and
   a memory medium coupled to the processor, wherein the memory medium stores program instructions executable by the processor to:
      detect a transaction between a client and a server that includes session state information, wherein the session state information relates to an application session between the client and the server, and wherein, during the application session, content of the application session is provided from the server to the client;
      record the session state information in response to said detecting;
      prevent termination of the application session after completion of the application session by the client;
      provide information regarding the application session for presentation to a user;
      receive user input requesting to review the application session to view a portion of the content based on the provided information, wherein said receiving is performed at a point in time after completion of the application session by the client; and
      generate a network request comprising captured credentials of the session state information, wherein said generating enables resumption of the application session.

26. The network monitoring device of claim 25, wherein, in providing information regarding the application session, the program instructions are further executable to provide a graphical user interface for receiving the user input requesting review of the application session.

27. A method for capture and resumption of an application session in a network system, the method comprising:
   detecting a transaction of the application session between a client and server, wherein the transaction includes session state information, wherein the session state information relates to the application session between the client and the server, and wherein,
   during the application session, content of the application session is provided from the server to the client;
   recording the session state information of the application session in response to said detecting;
   actively maintaining the application session between the client and server, wherein said actively maintaining comprises preventing a logout action for the client, wherein said actively maintaining is performed after completion of the application session by the client;
   providing information regarding the application session for presentation to a user;
   receiving user input requesting review of the application session to view a portion of the content based on the provided information; and
   generating a network request in response to said user input requesting review of the application session, wherein the network request comprises at least a portion of the session state information, wherein the at least a portion of the session state information comprises authentication credentials of the application session, wherein the network request is provided to the server, wherein said generating enables resumption of the application session;
   wherein said detecting, said recording, said actively maintaining, said providing, said receiving user input, and said generating are performed by a network monitoring device.

28. A method for capture and resumption of an application session in a network system, the method comprising:
   detecting a transaction of the application session between a client and server, wherein the transaction includes session state information, wherein the session state information relates to the application session between the client and the server, and wherein, during the application session, content of the application session is provided from the server to the client;
   recording the session state information of the application session in response to said detecting, wherein the session state information comprises authentication credentials;
   actively maintaining the application session between the client and server, wherein said actively maintaining the application session between the client and the server comprises periodically refreshing the application session, including replaying a prior request with authentication credentials or session state information, wherein said actively maintaining is performed after completion of the application session by the client;
   providing information regarding the application session for presentation to a user;
   receiving user input requesting review of the application session to view a portion of the content based on the information; and
   generating a network request in response to said user input requesting review of the application session, wherein the network request comprises the authentication credentials of the application session, wherein the network request is provided to the server, wherein said generating enables resumption of the application session;
   wherein said detecting, said recording, said actively maintaining, said providing, said receiving user input, and said generating are performed by a network monitoring device.

* * * * *